United States Patent [19]

Zibin

[11] 3,857,102

[45] Dec. 24, 1974

[54] PULSE COUNTER

[76] Inventor: Dzintar Karlovich Zibin, ulitsa Kveles, 15, korpus 6, kv. 10, Riga, U.S.S.R.

[22] Filed: Feb. 13, 1973

[21] Appl. No.: 332,138

[52] U.S. Cl................... 328/41, 307/223 R, 328/62

[51] Int. Cl........................ H03k 23/02, H03k 23/08

[58] Field of Search...... 307/223, 225, 226; 328/39, 328/41, 45, 48, 62

[56] References Cited

UNITED STATES PATENTS

| | | | |
|---|---|---|---|
| 3,183,365 | 5/1965 | Ligotky | 307/226 X |
| 3,310,660 | 3/1967 | Cogar | 307/225 R |

*Primary Examiner*—John Zazworsky

*Attorney, Agent, or Firm*—Holman & Stern

[57] ABSTRACT

A pulse counter including AND, OR, NOT gates and their combinations comprises two *n*-stage flip-flops, where $n = 5, 6, \ldots$ , the outputs of the first one of these flip-flops being connected through a first group of *n* AND gates to the inputs of the other flip-flop, the outputs of the latter being connected through a second group of *n* AND gates to the inputs of the first flip-flop. The other inputs of the AND gates in each group are interconnected and form the respective count inputs of the counter. In the *n*-stage flip-flops of the counter the output of each one of the *n* stages is connected to the inputs of *s* other inputs of the same flip-flop, and each one of the inputs of each said flip-flop is connected to the inputs of *s* stages of the same flip-flop, where $2 \leq s \leq n-3$.

1 Claim, 2 Drawing Figures

PULSE COUNTER

BACKGROUND OF THE INVENTION

The present invention relates to counters, and, more particularly, it relates to pulse counters adapted for incorporation in computing apparatus, digital measuring instruments and similar apparatus and devices.

There is known a pulse counter made up of logic gates AND, OR, NOT and combinations thereof, including two n-stage flip-flops, where $n$=3, 4, 5, ....., the outputs of the first one of these flip-flops being connected through a group of $n$ logic AND gates to the inputs of the other one of these flip-flops, the latter having the outputs thereof connected through another group of $n$ logic AND gates to the inputs of the first flip-flop, the other inputs of these logic AND gates in each one of the two groups being interconnected and forming the respective count inputs of the counter.

Each one of the two flip-flops of the known counter has the output of each stage thereof connected to the inputs of the $n - 1$ other stages of the same flip-flop. Each one of the inputs of the flip-flop is also connected to the inputs of these $n - 1$ stages.

The above-specified structure, of the counter complicates its circuitry and affects its load capacity, because an increased number of these $n$ stages sharply increases the number of connections between the stages of the flip-flops, as well as the quantity of the inputs of the logic elements forming the stages of the flip-flops. Thus, when $n$ equals only five, each stage must have four inputs for effecting interconnection of the stages, as well as four other inputs for connection to the inputs of the flip-flop, whereby manufacture of these counters presents practical difficulties.

In the above-specified known counter, the output of each stage of each one of the two flip-flops has connected thereto the inputs of $n$ other logic gates (i.e., of $n - 1$ stages of the same flip-flop and of an AND logic gate), and, therefore, the load capacity of the flip-flop, and, consequently, that of the counter, as a whole, equals $N - n$, where N is the factor of branching at the output of the logic gate forming a stage of the flip-flop. Thus, with the number $n$ of the stages increasing, the load capacity of the counter decreases; when $N = n$ this load capacity becomes equal to zero, and with $n > N$ no counter can practically be realized.

SUMMARY OF THE INVENTION

It is an object of the present invention to provide a pulse counter having a relatively small number of connections between the stages of the flip-flops.

It is another object of the present invention to provide a pulse counter having a smaller number of connections between one stages and inputs of the flip-flops.

It is yet another object of the present invention to provide a pulse counter having simpler logic gates and circuitry.

These and other objects are attained in a pulse counter including AND, OR, NOT logic gates and combinations thereof, comprising two $n$ —-stage flip-flops, where $n$ =5, 6, ...., the outputs of the first one of said two flip-flops being connected through a first group of $n$ logic AND gates to the inputs of the other one of said two flip-flops, the outputs of said other flip-flop being connected through a second group of $n$ logic AND gates to the inputs of the first said flip-flop, the other inputs of said AND gates in each said group being interconnected and forming the respective count inputs of said counter, in which counter, in accordance with the present invention, in each one of said $n$-stage flip-flops the output of each said stage is connected to the inputs of $s$ other stages of the same said flip-flop, and each input of each said flip-flop being connected to the inputs of $s$ stages of the same said flip-flop, where $2 \leq s \leq n-3$.

A pulse counter constructed in accordance with the present invention has a considerably smaller number of internal connections than the hitherto known above-specified counter.

As a result of the reduction of the number of internal connections within the flip-flops of a counter constructed in accordance with the invention, the latter can incorporate simpler logic gates with a reduced number of inputs and a smaller factor of branching.

The load capacity of the above-specified known counter equals $N - n$, and, consequently, in this counter the maximal possible number $n$ of the stages in the flip-flops thereof is positively limited by the value N. In the herein disclosed counter, however, e.g., with $s$ equaling 3, the load capacity is $N - (s+1) = N = 4$, i.e., the load capacity is independent of the value of $n$, which means that the maximal possible number of the stages in the flip-flops is not limited by the value of N.

BRIEF DESCRIPTION OF THE DRAWINGS

The present invention will be further described in connection with an embodiment thereof, with reference being had to the accompanying drawings, wherein.

DETAILED DESCRIPTION OF THE PREFERRED EMBODIMENT

Figure 1:
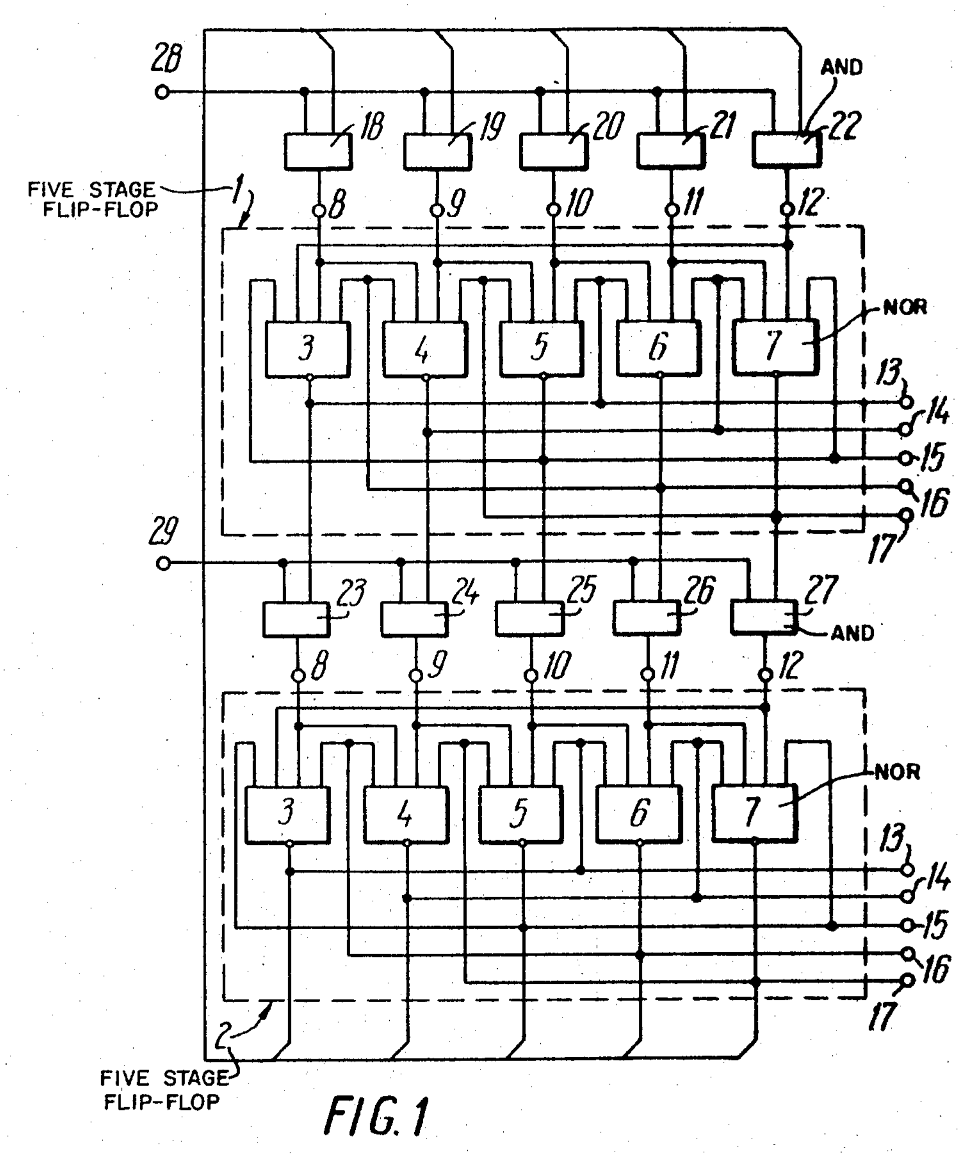
FIG. 1 is a block unit diagram of a two-phase pulse counter incorporating five-stage flip-flops, constructed in accordance with the invention.

Referring now in particular to the appended drawings, the pulse counter illustrated in FIG. 1 includes two five-stage flip-flops 1 and 2 in which each incorporates five stages 3, 4, 5, 6 and 7. Each one of the stages, 3, 4, 5, 6 and 7 is a NOR logic gate. The stages 3, 4, 5, 6 and 7 are interconnected in the following manner: the output of the stage 3 is connected to the inputs of the stages 5 and 6; the output of the stage 4 is connected to the inputs of the stages 6 and 7, the output of the stage 5 is connected to the inputs of the stages 7 and 3; the output of the stage 6 is connected to the inputs of the stages 3 and 4; the output of the stage 7 is connected to the inputs of the stages 4 and 5.

The respective inputs 8, 9, 10, 11 and 12 of the flip-flops 1 and 2 are connected to the stages 3 to 7 in the following manner: the input 8 is connected to the inputs of the stages 3 and 4; the input 9 is connected to the inputs of the stages 4 and 5; the input 10 is connected to the inputs of the stages 5 and 6; the input 11 is connected to the inputs of the stages 6 and 7; the input 12 is connected to the inputs of the stages 7 and 3.

The outputs of the stages 3 to 7 form the respective outputs 13, 14, 15, 16 and 17 of the flip-flops 1 and 2.

Furthermore, the herein disclosed pulse counter includes two groups in which each has five logic AND gates, namely, 18, 19, 20, 21, 22 and 23, 24, 25, 26, 27, respectively.

The flip-flops 1 and 2 and the logic AND gates 18 to 27 are interconnected in the following manner: the outputs of the logic AND gates 18 to 22 are connected, respectively, to the inputs 8 to 12 of the flip-flop 1; the outputs 13 to 17 of the flip-flop 1 are connected, respectively, to the inputs of the logic AND gates 23 to 27; the outputs of the logic AND gates 23 to 27 are connected to the inputs 8 to 12 of the second flip-flop 2, respectively; the outputs 13 to 17 of the flip-flop 2 are connected, respectively, to the inputs of the logic AND gates 18 to 22.

The other respective inputs of the AND gates 18 to 22 are interconnected and form the first count input 28 of the herein disclosed counter. The respective other inputs of the AND elements 23 to 27 are likewise interconnected and form the second count input 29 of the counter.

The above-disclosed embodiment of the present invention is a two-phase pulse counter incorporating five-stage flip-flops. A similarA similar principle can be employed for creating a counter having any other pair of equivalent known per se $n$-stage flip-flops ($n = 5, 6, 7$ ......). The term "equivalent" in the present disclosure is meant to indicate flip-flops having similar stable states. In every $n$-stage flip-flop incorporated in a counter constructed in accordance with the invention the output of each stage is connected to the inputs of $s$ other stages of the same flip-flop, where $2 \leq s \leq n - 3$. Thus, in the counter illustrated in FIG. 1 $s$ equals 2. The value of $n$ is selected to correspond to the desired scale factor of the counter.

A multi-phase counter having $m$ phases is constructed similarly to the construction of the above-described two-phase counter, with the difference that it contains $m$ flip-flops and $m$ groups of AND gates, as well as $m$ count inputs. Such an $m$-phase counter can be employed preferably as a phase number converter, a pulse distributor, etc.; it should be understood that, as far as the number of the incorporated logic gates is concerned, the structure of such an $m$-phase counter is more complicated than that of the above-described two-phase counter.

The construction of the above-described two-phase counter can be employed for creating a single-phase counter.

For instance, such a single-phase counter can be created by the addition of an inverter to the above-described two-phase counter. The input of the inverter is connected to one of the inputs of the counter, whereas the other input of the counter is connected to the output of the inverter. This last-mentioned counter enjoys a much wider field of application, since the majority of devices employed in the art of computing and counting incorporates single-phase counters.

The construction of the above-described two-phase counter can be employed for the creation of a multi-digit pulse counter.

This is effected by connecting two respective similar outputs (e.g., the output 17 of the flip-flop 1 and the output 17 of the flip-flop 2 in FIG. 1) of one two-phase counter of the herein disclosed structure to the count inputs of a second similar counter and by connecting the two respective similar outputs of the flip-flops of this second counter to the count inputs of a third similar counter, and so on.

In the herein described embodiment of the present invention the flip-flops incorporate NOR logic gates. However, a similar counter can have its flip-flops incorporating, as the stages thereof, NOT-AND, or NAND logic gates.

The selection of the logic gates to be employed is determined by the cost and by the electric ratings of these logic elements.

Figure 2:
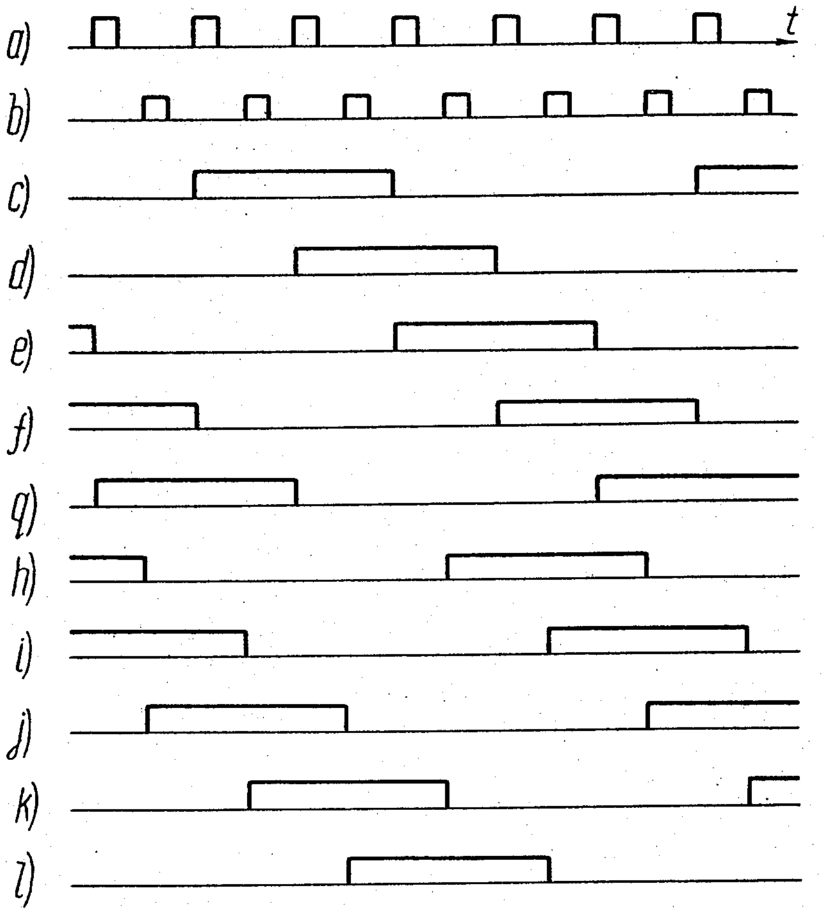
FIG. 2 *a, b, c, d, e, f, g, h, i, j, k, l* are time-related diagrams illustrating the operation of the pulse counter.

FIGS. 2 *a, b, c, d, e, f, g, h, i, j, k, l,* illustrate time-related voltage diagrams at different points of the circuitry of the herein described counter, namely:

FIG. 2 *a* represent the signals at the input 28 of the counter;

FIG. 2 *b* represent the signals at the input 29 of the counter;

FIG. 2 *c* represent the signals at the output 13 of the flip-flop 1;

FIG. 2 *d* represents the signals at the output 14 of the flip-flop 1;

FIG. 2 *e* represents the signals at the output 15 of the flip-flop 1;

FIG. 2 *f* represents the signals at the output 16 of the flip-flop 1;

FIG. 2 *g* represents the signals at the output 17 of the flip-flop 1;

FIG. 2 *h* represents the signals at the output 13 of the flip-flop 2;

FIG. 2 *i* represents the signals at the output 14 of the flip-flop 2;

FIG. 2 *j* represents the signals at the output 15 of the flip-flop 2;

FIG. 2 *k* represents the signals at the output 16 of the flip-flop 2;

FIG. 2 *l* represents the signals at the output 17 of the flip-flop 2.

In every one of the above diagrams the X axis is calibrated in units of time, while the Y axis is calibrated in the values of voltage (in the form of binary signals).

Let us consider the operation of the counter illustrated schematically in FIG. 1. All the electric signals at the inputs and outputs of the counter, as well as at the inputs and outputs of the logic gates incorporated in the counter can have either one of the two values to be presented hereinafter as 0 and 1, respectively, i.e., the signals are binary signals.

The logic gates incorporated in the counter are widely known per se. The effect the following functions of Boolean algebra:

$$\text{AND gate} - z = x \cdot y;$$

$$\text{NAND gate} - z = x \cdot y;$$

$$\text{NOR gate} - z = x + y;$$

where $x$, $y$ are binary signals (1 or 0) at the inputs of the gate;

$z$ is a binary signal at the output of the element;

. , + , − are, respectively, the symbols of conjunction, disjunction and negation in Boolean algebra.

The flip-flops 1 and 2 have the following stable states: 11000, 01100, 00011, 10001, where the binary symbols indicate the respective signals at the outputs 13, 14, 15, 16 and 17.

The operation of each one of the flip-flops is illustrated in Table 1, where the upper line contains every possible combination of input signals fed, respectively, to the inputs 8, 9, 10, 11 and 12 of the flip-flop, while the lower line contains the corresponding states into which this flip-flop is brought by these combinations of inputs signals.

Table 1

| | | | | | | |
|---|---|---|---|---|---|---|
| Inputs | 11000 | 0110 | 00110 | 00011 | 10001 | 00000 |
| Outputs | 00011 | 10001 | 11000 | 01100 | 00110 | $Q_i$ |

For instance, the first column 11000 / 00011 in Table 1 means that when the incoming signals at the inputs 8, 9, 10, 11 and 12 of the flip-flop 1 acquire a pattern 11000, the flip-flop 1 is brought into a state 00011 independently of the state it has been occupying before. Similarly, the last column indicates that when the incoming signals are 00000, the flip-flop 1 retains its previous state $Q_i$ that has been set by the preceding combination of the input signals.

In the initial state, when the signals at the inputs 28 and 29 are both 0 the signals at the outputs of all the AND gates 18, 19 ..... 27, i.e., at the outputs 8, 9, 10, 11 and 12 of the flip-flops 1 and 2 are also 0. This means that each one of the flip-flops 1 and 2 can then be in any one of the five possible stable states. Let us presume, for clarity sake, that the flip-flop 2 is in a state 11000. When a 1 signal is fed to the input 28 of the counter, the AND gates 18 and 19 are operated, and there appears at the inputs 8, 9, 10, 11 and 12 of the flip-flop 1 a combination of signals 11000 which, in accordance with Table 1 hereinabove, brings the flip-flop 1 into a state 00011. This state is maintained until the coming of the successive input signal. This successive signal 1 is fed to the input 29 of the counter, which makes the AND gates 26 and 27 operate, and there appears at the inputs 8, 9, 10, 11 and 12 of the flip-flop 2 a combination of signals 00011 bringing the flip-flop 2 into a state 011000, in accordance with above Table 1. The third input pulse is fed again to the input 28, and the flip-flop 1 acquires a state 10001. The operation is thereafter continued in a similar manner, as illustrated in time-related diagrams 2 *a* to 2 *l.*

The states of the flip-flops 1 and 2 in the herein disclosed counter vary in the following manner:

| Init. state | 1-st time-step | 2-nd time-step | 3-d time-step | 4-th time-step |
|---|---|---|---|---|
| 0 – $Q_i$ | 1 – 00011 | 0 – 00011 | 1 – 10001 | 0 – 10001 |
| 0 – 11000 | 0 – 11000 | 1 –01100 | 0 – 01100 | 1 – 00110 |

| 10-th time-step | 11-th time-step |
|---|---|
| 0 – 00110 | 1 – 00011 |
| 1 – 11000 | 0 – 11000 |

It can be seen that in the 10-th time-step, i.e., after the coming of the tenth input signal the counter returns into its initial state, whereafter the operation cycle repeats itself.

Therefore, if all the input pulses are counted, the counter displays a scale factor 2 × 5 = 10, and, for a general case, the scale factor is 2· *n*.

In an alternative mode of operation, when, only those pulses which are fed to one of the inputs are counted, while the pulses fed to the other input are auxiliary ones (as is the case with the above-described single-phase counter incorporating an inverter at the input thereof), the scale factor is 5 (in general, in this mode of operation the scale factor equals *n*).

It can be seen in FIGS. 2 *c, d, e ... l* that there are formed at the outputs of the herein disclosed counter tenphase trains of pulses, since the counter operation cycle is divided into ten phases, the pulses in two adjacent phases being shifted through one time-step. Quite naturally, the outputs of either one of the flip-flops 1 and 2 can be used exclusively, with the result that there will be only 5 phases with the pulses in the adjacent phases being shifted through two time-steps. In the general case, there are formed at the outputs of a counter of the herein disclosed type $m \times n$ — phase trains of pulses. Consequently, the herein disclosed apparatus can be employed as means for forming multi-phase trains of pulses, or else as a phase number converter, since the number of the phases at the output of the apparatus is different from the number of the phases at the input thereof.

In the hereinabove described embodiment of the present invention shifting of the states of the flip-flops is effected in steps $h$=1; thus, if $Q_i$=11000, then $Q_{i+1}$ = 01100. By simple variation of the circuitry of this counter it is possible to ensure that h would be = 2, h=3, h=4 and, in general, $h$ = 1, 2, ..... $n$ −1. Thus, when the outputs 13 to 17 of the flip-flop 2 are to be connected to the AND gates 18 to 22 they are connected in the following way: output 13 to input 18, output 14 to input 19, output 15 to input 20, output 16 to input 21, output 17 to input 22, as has been described hereinabove in connection with the embodiment of the invention, then $h$ = 1. However, if the above connections are varied but slightly, e.g., output 13 to input 19, output 14 to input 20, output 15 to input 21, output 16 to input 22, output 17 to input 18, then $h$ = 2, and if $Q_i$ = 11000, then $Q_{i+1}$ = 00110 and $Q_{i+2}$ = 10001, etc.

In the herein described embodiment of the present invention in every stable state of either one of the flip-flops 1 or 2 at least two stages are in a 1 state. In case it is necessary to have a code "one of *n*" at the output of the apparatus, a decoder device should be added thereto, connected to the outputs 13 to 17 of the counter.

A structure of such a decoder device can be readily envisaged by any person competent in the art. For instance, in case of the hereinabove described embodiment of the invention, such a decoder device should include five two-input AND elements. Therefore, it is not considered necessary to describe it in detail in the present disclosure.

What we claim is:

1. A pulse counting circuit comprising; a first $n$-stage flip-flop, each stage having a plurality of inputs, and an output; a second $n$-stage flip-flop, each stage having a plurality of inputs, and an output; a first group of logic elements including $n$ logic AND-gates, each gate having two inputs, and an output; a second group of logic elements including "n" logic AND- gates, each gate having two inputs, and an output; said output from each respective stage of said first $n$-stage flip-flop being connected to a respective input of a different AND-gate of said second group of elements, the output from each said AND-gate of said second group being connected to a respective input of a different stage of said second $n$-stage flip-flop; said output from each respective stage of said second $n$-stage flip-flop being connected to a respective input of a different AND-gate of said first group of elements, the output from each said AND-gate of said first group being connected to a respective input of a different stage of said first $n$-stage flip-flop; the other input of each -AND-gate of said first group being interconnected and forming a first count input; the other input of each AND-gate of said second group being interconnected and forming a second count input; wherein the output of each stage of said first $n$-stage flip-flop is connected to another input of each of $s$ other stages of said first $n$-stage flip-flop; and wherein the output of each stage of said second $n$-stage flip-flop is connected to another input of each of $s$ other stages of said second $n$-stage flip-flop; $n$ constituting a number at least equal to 5, and wherein $s$ constitutes a number where $2 \leqslant s \leqslant n-3$.

* * * * *